United States Patent [19]

Bott

[11] 4,364,500
[45] Dec. 21, 1982

[54] VEHICLE LUGGAGE CARRIER

[76] Inventor: John A. Bott, 931 Lakeshore Dr., Grosse Pointe Shores, Mich. 48236

[21] Appl. No.: 239,128

[22] Filed: Feb. 27, 1981

Related U.S. Application Data

[63] Continuation of Ser. No. 57,346, Jul. 13, 1979, abandoned, and a continuation of Ser. No. 952,393, Oct. 18, 1978, abandoned, which is a continuation-in-part of Ser. No. 798,576, May 19, 1977, abandoned, which is a continuation-in-part of Ser. No. 725,500, Sep. 22, 1976, Pat. No. 4,156,497.

[51] Int. Cl.³ .................................................. B60R 9/00
[52] U.S. Cl. .................................... 224/325; 224/321; 224/326
[58] Field of Search ............... 224/326, 327, 325, 324, 224/321

[56] References Cited

U.S. PATENT DOCUMENTS

| | | | |
|---|---|---|---|
| 3,181,753 | 5/1965 | Fitch | 224/309 |
| 3,253,755 | 5/1966 | Bott | 224/321 |
| 3,325,067 | 6/1967 | Helm | 224/325 X |
| 3,330,454 | 7/1967 | Bott | 224/321 |
| 3,623,642 | 11/1971 | Stephen | 280/179 R |
| 3,643,973 | 2/1972 | Bott | 280/179 R |
| 3,715,097 | 2/1973 | Kalajian | 248/449 |
| 3,931,919 | 1/1976 | Gerber et al. | 224/324 |
| 4,099,658 | 7/1978 | Bott | 296/37.7 |
| 4,106,680 | 8/1978 | Bott | 224/324 |
| 4,182,471 | 1/1980 | Bott | 224/326 |

*Primary Examiner*—Steven M. Pollard
*Attorney, Agent, or Firm*—Harness, Dickey & Pierce

[57] ABSTRACT

A luggage or article carrying system for operative association with an automotive vehicle having an exterior generally horizontal surface, such as a trunk lid or roof, the system comprising a pair of elongated slats on the surface in respective positions on opposite sides of the longitudinal axis of the body and extending substantially parallel to the longitudinal axis of the body, the slats being permanently secured to the body and being substantially rectangular in the vertical cross section with a width substantially greater than the height and presenting a low profile on the vehicle, the tops of the slats being substantially flat and parallel to the horizontal surface and providing longitudinally extending channels by which a pair of laterally extending cross slats may be secured their opposite ends to the longitudinally extending slats, the cross slats being adapted to underlie articles supported on the carrier so as to obviate the need for supplemental reinforcement of the vehicle trunk lid or roof, with the cross slats being longitudinally moveable or adjustable along the longitudinally extending slats and being totally removable therefrom, and a pair of transversely or laterally extending article constraining bars or rails supported at their opposite ends upon the longitudinally extending slats by means of a plurality of stanchion assemblies disposed one at each end of each of the cross bars, the stanchion assemblies and cross bars being longitudinally adjustable along the longitudinally extending slats and being removable therefrom along with the cross slats during periods of non-use.

18 Claims, 11 Drawing Figures

VEHICLE LUGGAGE CARRIER

This is a continuation of application Ser. No. 57,346, filed July 13, 1979, now abandoned, a continuation of Ser. No. 952,393, filed Oct. 18, 1978, now abandoned, which is a continuation-in-part of Ser. No. 798,576, filed May 19, 1977 now abandoned, which is a continuation-in-part of Ser. No. 725,500, filed Sept. 22, 1976, now U.S. Pat. No. 4,156,497.

SUMMARY AND BACKGROUND OF THE INVENTION

The present invention relates generally to vehicle luggage carriers and more particularly, to a new and improved vehicle luggage carrier of the type shown in the applicant's U.S. Pat. No. 4,099,658 issued July 11, 1978. More specifically, the luggage carrier of the present invention is of the type which comprises two or more slat-type elements which are fixedly secured to an exterior horizontal surface of a vehicle, such as the trunk lid or vehicle roof, and which are permanently attached thereto and adapted to have ancillary article constraining members be removably and adjustably secured thereto. In one preferred embodiment of the present invention, the carrier comprises a pair of longitudinally extending slat elements which are fixedly secured to the associated vehicle roof portion adjacent the laterally outer sides thereof and the remaining components of the carrier are removably secured to these slat elements. A particular feature of the present invention resides in the fact that no intermediate slat elements are required to extend longitudinally of the vehicle between the aforementioned outer two slat elements which, in the part, has frequently necessitated that the associated vehicle structure be provided with ancillary strengthening or rigidifying means. For example, when luggage carriers of the type disclosed herein have been operatively mounted on a vehicle roof, it has often been necessary to provide supplemental reinforcing ribs or roof bows in order to strengthen the roof so that loads in excess of a minimum level can be carried upon load supporting slats located centrally of the roof. The present invention obviates the need for such ancillary roof bows through the provision of two or more cross slats that are supported at their opposite ends upon the aforementioned longitudinally extending slat elements and which act to transfer the load of articles supported generally in the center of the roof to the laterally outer edges thereof that are significantly more capable of carrying such loads, as compared with the central portion of the vehicle roof. The cross slats, along with associated transversely extending article constraining bars or rails, are intended to be completely removable from the longitudinally extending slat elements during periods of non-use so that the luggage carrier provides an extremely low profile for aesthetic purposes and to minimize wind resistance and wind noise. Accordingly, the present invention provides a novel luggage carrier for a vehicle which is capable of carrying relatively large and heavy articles, such as suitcases, boxes, or the like but which obviates the expense, time and attendant added weight which results from supplementing the strength of the vehicle roof with additional strengthening or rigidifying members.

It is accordingly a general object of the present invention to provide a new and improved vehicle luggage or article carrier system.

It is a more particular object of the present invention to provide a new and improved article carrier which includes at least a pair of low profile slat elements fixedly secured to the vehicle and a second pair of article constraining members which may be in the form of slats or article constraining bars, that are adjustably and removably secured to the first pair of slat elements.

It is another object of the present invention to provide a new and improved luggage carrier, as above described, that is adapted to be used on a vehicle roof without requiring supplemental roof reinforcing means, such as roof bows or the like which have been required heretofore.

It is still a more particular object of the present invention to provide a vehicle luggage carrier which comprises a first pair of slat elements mounted on a vehicle and a second pair of slat elements which are arranged at generally right angles to the first pair and are adjustably and removably secured thereto.

It is a related object of the present invention to provide a new and improved luggage carrier of the above-described type wherein the first mentioned pair of slat elements may extend either longitudinally or transversely of the associated vehicle.

It is another object of the invention to provide a new and improved vehicle luggage carrier wherein the first mentioned pair of slat elements extend longitudinally of the vehicle, the second mentioned pair extend laterally of the vehicle and which includes a pair of article constraining cross bars also extending laterally of the vehicle, with the cross bars and second mentioned pair of slats being removably and adjustably secured to the first mentioned pair of slat elements.

It is yet another object of the present invention to provide a vehicle luggage carrier, as above described, wherein the cross slats are slidably secured to the longitudinally extending slat elements or alternatively, are secured to the longitudinally extending slats by fastening means cooperable with a series of longitudinally spaced mounting bores provided in the longitudinally extending slats.

It is a further object of the present invention to provide a new and improved vehicle article carrier which may be provided with a plurality of tie down assemblies for securing the cross slats in place and for providing means to which rope like tie down devices may be secured to the article carrier.

It is still another object of the present invention to provide a new and improved vehicle article carrier of the above-described type wherein the cross bars or rails may have additional article securing means, such as ski racks, bike racks, or the like mounted thereon.

Other objects and advantages of the present invention will become apparent from the following detailed description taken in conjunction with the following drawings.

BRIEF DESCRIPTION OF THE DRAWINGS

FIG. 9 is a view similar to views 1-3 and illustrates another embodiment of the luggage carrier of the present invention;

DESCRIPTION OF THE PREFERRED EMBODIMENTS

Figure 1:
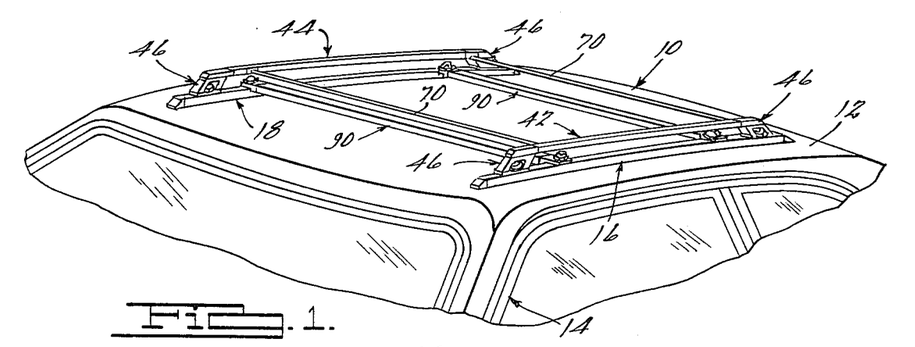
FIG. 1 is an elevated perspective view of one embodiment of the vehicle luggage carrier of the present invention shown in operative association with a portion of an automotive vehicle.
Figures 5, 6, 7, 8:
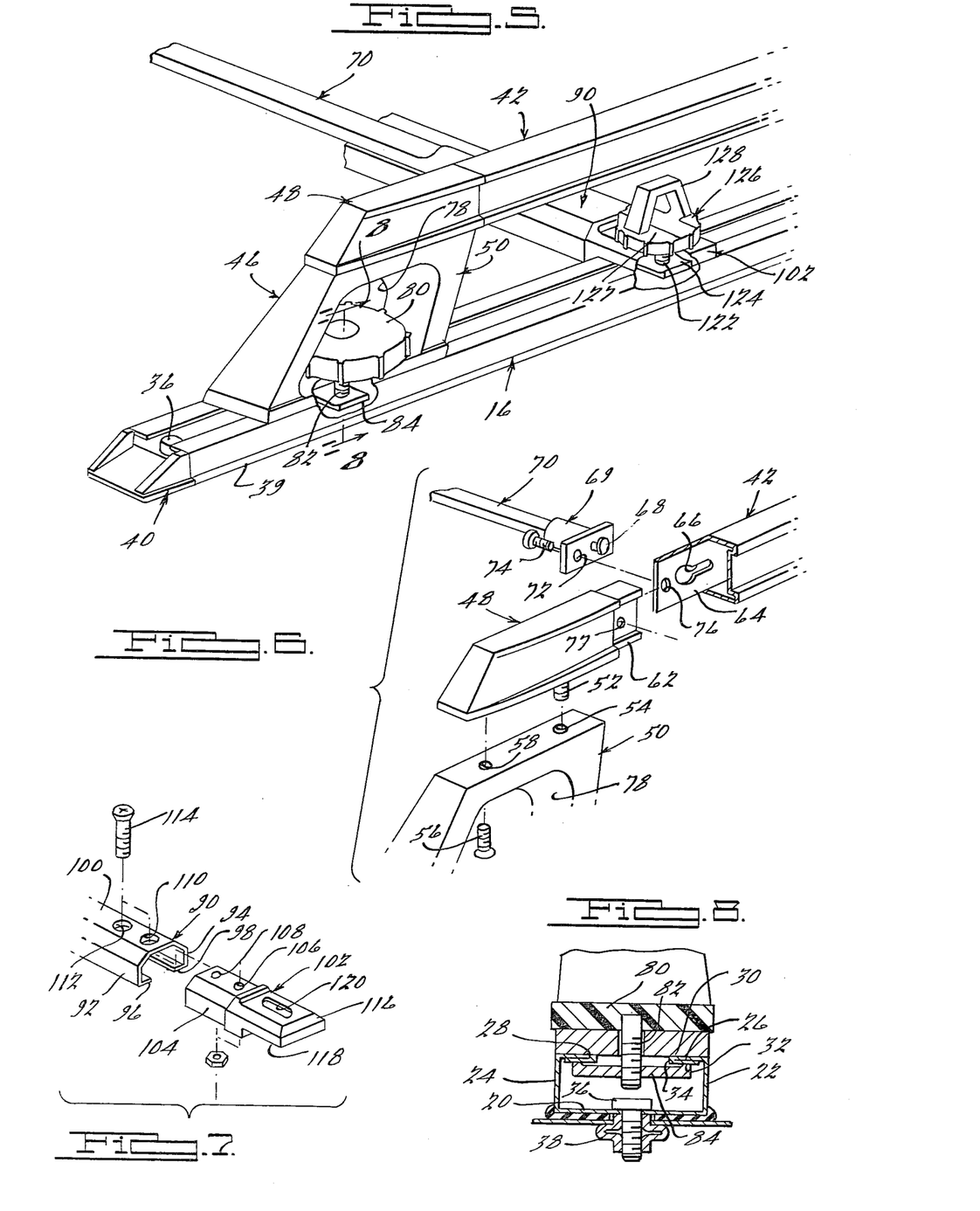
FIG. 5 is an enlarged elevated perspective view, partially broken away, of a portion of the luggage carrier illustrated in FIG. 1.
FIG. 6 is an exploded assembly view of a portion of the structure shown in FIG. 5.
FIG. 7 is an exploded assembly view of another portion of the luggage carrier shown in FIG. 5.
FIG. 8 is an enlarged fragmentary transverse cross sectional view taken substantially along the line 8—8 of FIG. 5.

Referring now in detail to the drawings and in particular to FIG. 1 thereof, a vehicle luggage carrier 10 is shown in operative association with a generally horizontally disposed roof portion 12 of a typical automotive vehicle 14. Generally speaking, the luggage carrier 10 comprises a pair of laterally spaced, longitudinally extending slats 16 and 18 which are secured upon the roof portion 12 at positions adjacent the lateral sides or edges thereof as will later be described. As shown in FIGS. 5 and 8, each of these slats comprises a generally flat lower base portion 20 and a pair of upstanding, spaced parallel side portions 22, 24 which terminate at their upper ends in a pair of laterally inwardly extending, generally coplanar arranged flanges 26, 28 respectively. The flanges 26, 28 define upper and lower clamping surfaces 30, 32, respectively, and provide longitudinally extending channel 34. The slats 16, 18 may be of various constructions, such as extruded aluminum, or roll-formed sheet metal, such as stainless steel or the like. Preferably, the slats 16, 18 are of uniform cross sectional shape along the entire lengths thereof, with a result that the channels 34 defined therewithin are coextensive of the length of the slats 16, 18. The slats 16, 18 are fixedly secured to the vehicle roof portion 12 by means of suitable longitudinally spaced fastening elements 36 which extend downwardly through suitable openings in the base portions 20 thereof and are secured to suitable fastening elements, such as riv-nuts 38 or equivalent fastening devices mounted within the roof portion 12. Preferably, a suitable resilient or elastomeric pad is provided interjacent the underside of the slats, 16, 18 and the confronting portion of the vehicle roof 12, as shown in FIG. 8. Additionally, the opposite ends of each of the slats 16, 18, are preferably provided with suitable end caps 40 which may be secured in place by the same fastening elements 36 which secure the slats 16, 18 to the roof portion 12, the end caps 40 being of a design so as to define channel-like areas leading into the channels 34 of the slats 16, 18, for purposes hereinafter to be described.

Together with the slats 16, 18, the luggage carrier 10 comprises a pair of longitudinally extending article constraining rails 42, 44 which are disposed directly above the slats 16, 18, respectively and are adjustably and removably mounted thereupon by means of a plurality of four stanchion assemblies, generally designated by the numeral 46, which are located one at each end of each of the rails 42, 44, as seen in FIG. 1. With reference to FIGS. 5 and 6, it will be seen that the stanchion assemblies 40, 46 comprise upper stanchion sections 48 and lower stanchion sections 50 which may be fabricated of the same or different materials, depending upon the design and application of the luggage carrier 10 of the present invention. The upper and lower stanchion sections 48, 50 may be secured together in a variety of different ways, for example, by means of a pilot lug 52 extending downwardly from the upper stanchion section 48 into a suitable blind bore 54 in the upper end of the lower stanchion section 50, with a suitable fastening element 56 extending upwardly through a bore 58 formed in the upper end of the lower stanchion section 50 and threadably connected with the underside of the upper stanchion section 48. As seen in FIG. 6, the rails 42, 44 are of a generally rectangular shape in transverse cross section and are adapted to telescopically receive longitudinally extending bosses or lugs 62 at the opposite ends thereof which extend longitudinally from the associated or adjacent of the upper stanchion sections 48. The ends of the rails 42, 44 are provided with longitudinally extending end portions 64 which are formed with key-hole shaped slots 66 which are adapted to receive laterally outwardly extending lugs 68 formed on the outer ends or sides of associated cross rail end fittings 69. Four end fittings 60 are fixedly secured one to each end of a pair of laterally extending article constraining rails or bars 70 which are adapted to be secured via the end fittings 69 to the stachion assemblies 46. Once the lugs 68 are inserted into the slots 66 of the side rails 42, 44 and the rails 42, 44 are moved into proper longitudinal and telescopic relation with the associated stanchion assemblies 46, openings 72 on the end fittings 69 are aligned with openings 76 on the end portions 64 of the associated side rails, whereby suitable fastening elements such as screws, or the like 74, may be threadably inserted through the openings 72, 76 and be threadably engaged with suitable openings or bores 77 of the upper stanchion sections 48, whereby to fixedly secure the side rails 42, 44, stanchion assemblies 46 and cross rails 70 into a unitized generally rectangularly shaped luggage carrier assembly.

As best seen in FIG. 5, each of the lower stanchion sections 50 is provided with an opening or recess 78 within which an annular locking element knob 80 is rotatably disposed. Extending downwardly from the element 80 of each of the assemblies 46 is an externally threaded stud 82 which is adapted to threadably engage a suitable bore in an associated clamping plate 84 which is slidably disposed within the channel 34 of the associated slat 16, 18. As will be appreciated by those skilled in the art, in order to secure the article constraining assembly consisting of the side rails 42, 44 cross rails 70 and stanchion assemblies 46 upon the slats 16, 18, the locking elements 80 of each of the stanchion assemblies 46 is rotated such that the clamping plate 84 is drawn upwardly to effect clamping engagement of the flanges 26, 28 of the associated slats 16, 18. If it is desired to longitudinally adjust the aforesaid assemblage longitudinally of the slats 16, 18, the elements 80 are merely loosened so as to release the clamping engagement between the clamping plates 84 and the flanges 26, 28, permitting longitudinal sliding of the assembly or permitting total removal thereof from the slats 16, 18, if desired.

In accordance with the present invention, the luggage carrier 10 is provided with a pair of cross or transverse slats 90 which, as best seen in FIG. 7, are of a generally inverted U-shape configuration in transverse section and include side portions 92, 94, bottom flange portions 96, 98, and an upper or top load or article supporting portion 100. Each of the cross slats 90 is provided with a pair of end fittings 102 having mounting portions 104 adapted to be telescopically inserted into the adjacent ends of the slats 90, the mounting portions 104 being provided with suitable bores 106, 108 which are intended to be aligned with suitable openings 110, 112 in the ends of the cross slats 90 to permit screws, bolts or the like 114 to be inserted through the aligned openings to fixedly secure the fittings 102 to the slats 90. Each of the end fittings 102 comprises a laterally outwardly extending securing portion 116, the undersides 118 of which are adapted to rest or bear upon the upper surfaces of the associated slats 16, 18, the securing portions 116 being provided with laterally disposed slots 120 through which generally vertically disposed mounting studs 122 may extend so as to be connectable with clamping plates 124 of the same general construction as the aforementioned plates 84 which are slidably disposed within the channels 34 of the slats 16, 18. The upper ends of the studs 122 are connected to rotatable tie down members, generally designated by the numeral 126 which include an annular manually rotatable portion 127 and an upwardly projecting tie down loop or the like 128. The tie down members 126 are adapted to operate in essentially the same manner as the aforedescribed locking elements 80 in providing for selective longitudinal adjustment of the cross or transverse slats 90 longitudinally of the longitudinal extending slats 16, 18, with suitable rotation of the members 126 effecting clamping engagement of the associated clamping plates 124 with the lower clamping surfaces 32 of the slats 16, 18 and conversely, release of the clamping engagement between the plates 124 and the surfaces 32 upon rotation of the members 126 in the opposite direction. Thus, the cross slats 90 may be removed from the slats 16, 18 during periods of non-use and may be longitudinally moved along the lenght of the slats 16, 18 so as to be adjustable commensurate with the size and type of load which is being carried upon the associated vehicle 14. In a preferred construction of the present invention, the cross slats 90 are of a relatively heavy gauge material so that large loads may be carried thereupon without requiring any ancillary or supplementary support of the associated vehicle roof portion 12 and without requiring any permanently mounted intermediate slats extending parallel to the slats 16, 18. By virtue of the fact that both of the side rails 42, 44 and cross rails 70 may be conveniently removed from the slats 16, 18 along with the stanchion assemblies 46 and cross slats 90 at such time as no articles are to be carried on the associated vehicle, the entire luggage carrier with the exception of the two slats 16, 18 may be removed to eliminate wind noise, wind drag, resistance, etc..

Figure 2:
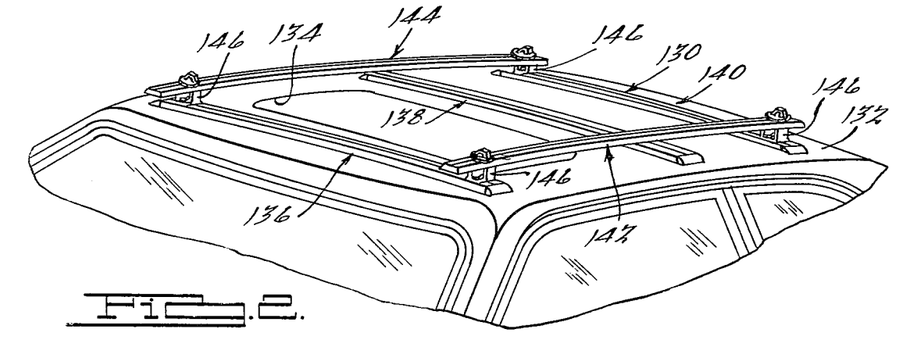
FIG. 2 is a view similar to FIG. 1 and illustrates an alternate embodiment of the present invention.

Referring now to FIG. 2, a vehicle luggage carrier 130 is shown in operative association with a vehicle roof portion 132 which, by way of example, is provided with a "sun roof" type opening, generally designated by the numeral 134. The luggage carrier 130 comprises a plurality of three laterally or transversely extending slots 136, 138 and 140 which are spaced longitudinally of the vehicle roof portion 132. Additionally, the luggage carrier 130 comprises a pair of longitudinally extending, laterally spaced side rails, 142 and 144 which are arranged adjacent the lateral side edges of the roof portion 142. The plurality of slats 136-140 are preferably of the same construction as the aforementioned slats 16, 18 and are secured to the associated vehicle in essentially the same manner to the roof portion 132 as the slats 16, 18 are secured to the aforementioned roof portion 12. The longitudinally extending side rails 142, 144 are adapted to be transversely or laterally adjustable relative to the slats 136-140 and are provided with suitable stanchion means, representively designated by the numeral 146, which may be similar to the aforementioned stanchion assemblies 46 and are provided with suitable means-such as rotatable locking elements, for adjusting the lateral position of the side rails 142, 144 along the slats 136-140. The construction of the side rails 142, 144 may be the same or similar to the aforementioned side rails 42, 44 or may be similar or identical to the rails 220 which are hereinafter to be described in connection with the embodiment of the invention as shown in FIGS. 9-11, depending upon the particular type of application and size automobile with which the luggage carrier 130 is to be operatively associated.

Figure 3:
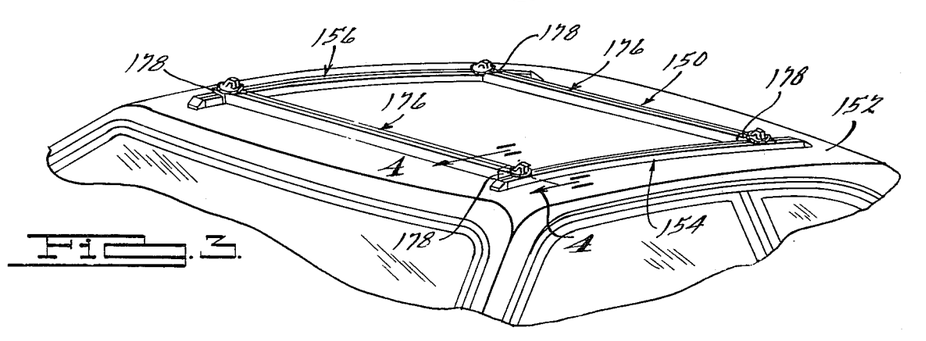
FIG. 3 is a view similar to FIGS. 1 and 2 and illustrates yet another embodiment of the present invention.
Figure 4:
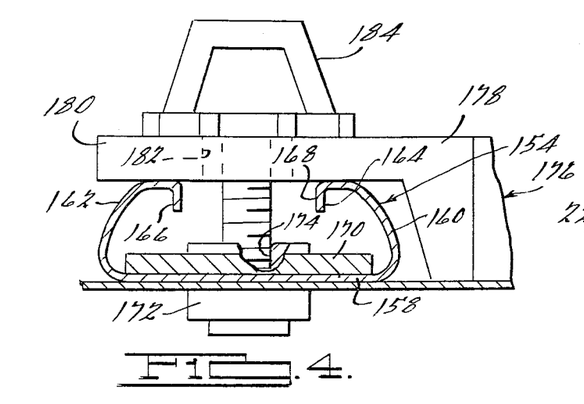
FIG. 4 is an enlarged transverse cross sectional view taken substantially along the line 4—4 of FIG. 3.

FIGS. 3 and 4 illustrate another alternate embodiment of the present invention wherein a luggage carrier 150 is shown in operative association with a vehicle roof portion 142 and comprises a pair of longitudinally extending, laterally extending slats 154, 156. As best seen in FIG. 4, the slats 154, 156 comprise a base portion 158, and upwardly and inwardly extending side portions 160, 162 which terminate at their upper end in downwardly extending flange portions 164, 166, respectively, the flange portions 164, 166 defining a longitudinally extending channel 168. In accordance with this embodiment of the present invention, each of the slats 154, 156 is provided with a longitudinally extending strengthening or rigidifying plate 170 internally thereof, which plates 170 are secured along with the slats 154, 156 to the associated vehicle roof portion 152 by means of a plurality of longitudinally spaced riv-nuts or similar devices 172 which define internally threaded bores 174 therewithin. The luggage carrier 150 is provided with a pair of transversely or laterally extending cross slats, generally designated with the numeral 176, which are of a generally inverted U-shaped configuration, such as the cross slats 90 in FIG. 7. Each of the cross slats 176 is provided with an end fitting 178 which may be of generally the same construction as the aforementioned end fittings 102 and is provided with a suitable slot 182 through which a suitable threaded stud 184 may extend for threaded engagement with one of the bores 174 of the plurality of riv-nuts 172. The upper ends of the studs 184 are preferably provided with suitable tie down members 188 which may be of the same general construction as the aforementioned tie down members 126 and which effect rotation of the studs 186 in order to clampingly secure the fittings 178 and hence the cross slats 176 at selected longitudinal positions along the slats 154, 156. It is to be noted that the strengthening plates 170 may be provided with additional threaded bores along the lengths thereof over and above those provided by the riv-nuts 172, whereby to provide a greater number of positions to which the cross slats 176 may be secured, as will be appreciated by those skilled in the art.

Figure 10:
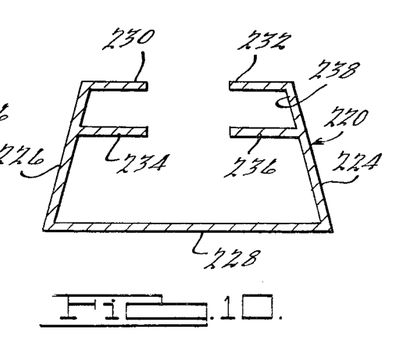
FIG. 10 is an enlarged transverse cross sectional view taken substantially along the line 10—10 of FIG. 9.
Figures 10, 11:
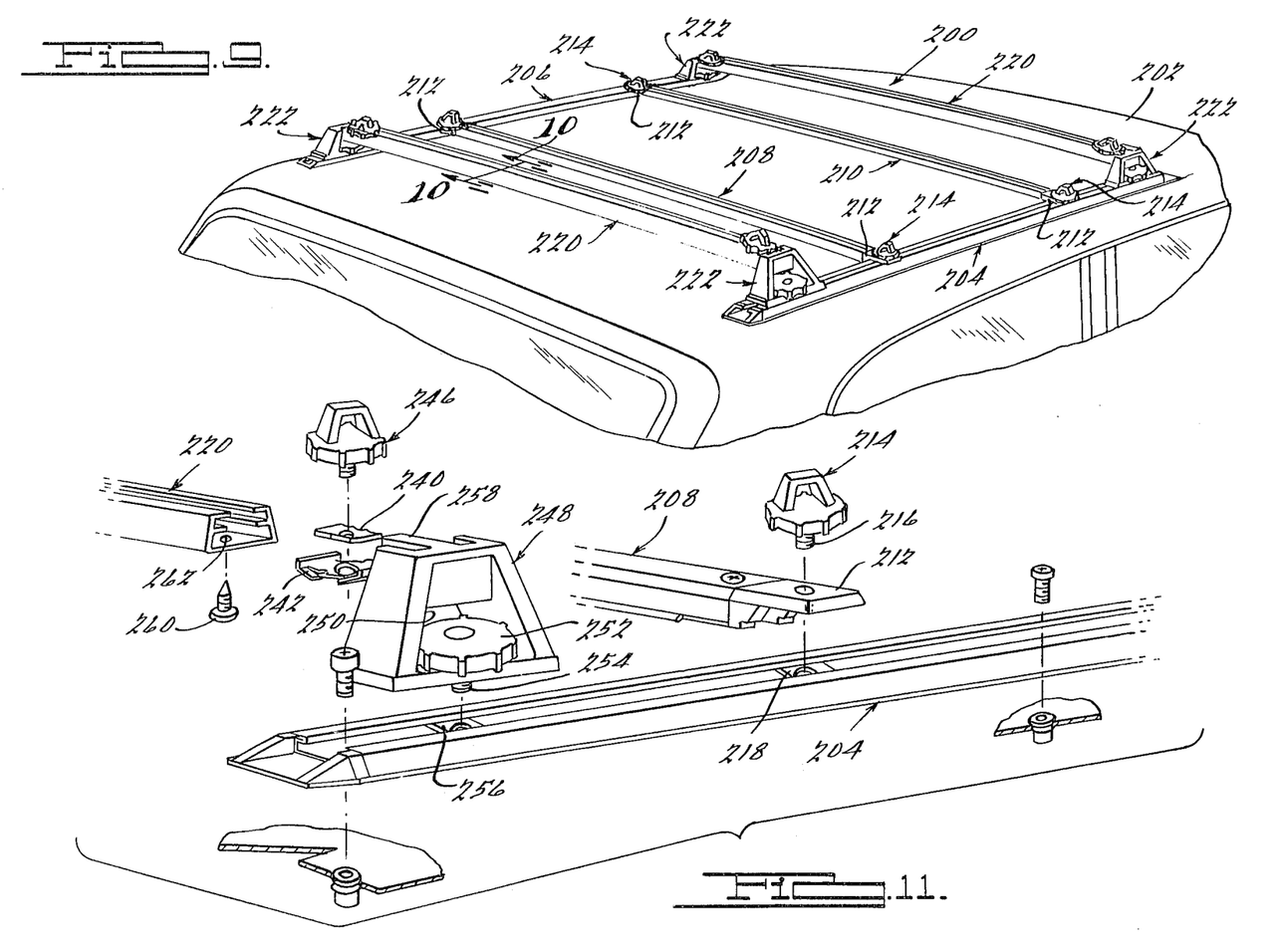
FIG. 11 is an exploded assembly view of a portion of the luggage carrier illustrated in FIG. 9.

Referring now to FIGS. 9-11, another alternate embodiment of the present invention is shown as comprising a luggage carrier 200 which is operatively associated with a vehicle roof portion 202 and includes a pair of longitudinally extending, laterally spaced slats 204 and 206 which may be of generally the same construction as the aforementioned slats 16, 18. The luggage carrier 200 also comprises a pair of laterally extending cross slats 208, 210 which are provided with end fittings 212 at the opposite ends thereof and are preferably of the same general construction as the cross slats 90 of the luggage carrier 10 hereinabove described. The opposite ends of the cross slats 208, 210 are adapted to be adjustably and removably secured to the longitudinally extending slats 204, 206 by means of tie down assemblies including tie down members 214 which may be the same in construction as the aforementioned tie down members 126 and include threaded studs 216 which are adapted to cooperate with clamping plates 218 that are longitudinally slidably disposed within the slats 204, 206 for adjustably securing the cross slats 208, 210 at selected longitudinal positions along the slats 204, 206. The luggage carrier 200 also includes a pair of cross rails, generally designated by the numeral 220, which extend laterally or transversely between the slats 204, 206 and are spaced upwardly from the plane of the roof portion 200 and are operatively supported upon the slats 204, 206 by means of a plurality of four stanchion assemblies, generally designated by the numeral 222, which are located one at each end of the cross rails 220, as shown in FIG. 9. The cross rails 220 may be of any suitable construction but are preferably of the cross sectional shape shown in FIG. 10 and comprise upwardly converging sides 224, 226, a bottom or lower portion 228 and laterally inwardly extending, vertically spaced pairs of flange portions 230, 223, and 234, 236 which define a track or channel 238 which is coextensive of the length of the cross rails 220. The track or channel 238 of each of the cross rails 220 is adapted to receive one or more clamping plates 240 which may be of the same general construction as the aforedescribed clamping plates 84 and may be provided with retainer elements 242 which prevent longitudinal sliding movement of the clamping plates 240 when associated tie down members 246 have their downwardly extending externally threaded stud elements disengaged from the threaded bores of the clamping plates 240.

Each of the stanchion assemblies 222 comprises a stanchion body 248 which may, for example, be fabricated of injection molded plastic or die-cast metal, and defines a central recess or opening 250 within which an adjustment knob or element 252 is rotatably disposed in essentially the same manner in which the element 80 is mounted in each of the stanchion assemblies 46, hereinabove described. Extending downwardly from the adjustment elements 252 are externally threaded studs 254 which are threadably engageable with clamping plates 256 which are slidably disposed within the slats 204, 206 and cooperate with the elements 252 in adjustably securing the stanchion assemblies 222 at selected longitudinal positions along the slats 204, 206. Each of the stanchion bodies 248 includes an inwardly projecting mounting portion 258 which is adapted to be telescopically received within the adjacent end of the associated cross rail 220 and be secured therewithin by means of a suitable screw, bolt or the like 260 which extends upwardly through an opening 262 in the adjacent end of the cross rail 220, whereby the cross rails 220 and stanchion assemblies 222 are longitudinally adjustable along the slats 204, 206 and are concomitantly removable therefrom when it is desired to minimize the structural components of the luggage carrier 200 during periods of non-use or when the cross rails 220 are not required to operatively support articles upon the associated vehicle.

It will be seen from the foreoing that the present invention provides a new and improved luggage carrier which embodies a number of features not shown in the prior art. In particular, the luggage carrier of the present invention provides an arrangement by which the luggage or article constraining members may be conveniently adjusted to accommodate different size articles and may be totally removed from the carrier during periods of non-use, thereby minimizing wind noise and wind resistance to the extreme. Additionally, the luggage carrier of the present invention provides a construction which obviates the need for supplemental strengthening members of the associated vehicle, such as supplemental roof bows which have been necessitated when intermediate slat elements have been utilized in prior art arrangements. By providing cross slats which are longitudinally adjustable, loads of various sizes and configurations may be supported upon the cross slats, and by having both the cross slats and luggage constraining cross rails longitudinally adjustable, universality of application will be assured. An additional feature of the present invention resides in the fact that various ancillary article constraining members, such as ski racks, bike racks, utility boxes, etc. may be removably secured to the cross rails, particularly when they are of the type shown in FIGS. 9–11, so as to further enlarge the number of potential uses of the luggage carrier of the present invention. It will be appreciated, of course, that additional cross slats and/or cross rails may be utilized depending on the size and type of load and that by virtue of the strength of such cross slats, additional size loads will not result in any damage to the associated vehicle since such loads will be transmitted or distributed to the outer edges of the roof via the cross slats where the primary supporting structure of typical vehicle roofs is located.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:
1. An article carrier for use on a generally horizontally disposed surface of an automotive vehicle, said carrier comprising:
a first pair of spaced parallel slat elements fixedly secured to the vehicle surface, said slat elements having upper article supporting surfaces located between said generally horizontally disposed surface and the lower side of articles on said carrier, each of said slats having major and minor transverse cross-sectional dimensions with said major dimensions being parallel to said generally horizontally disposed surface;
a second pair of spaced parallel slat elements arranged at generally right angles to said first mentioned pair thereof, said second pair of slat elements having upper article supporting surfaces located between said generally horizontally disposed surface and the lower side of articles on said carrier, each of said second pair of slats having major and minor transverse dimensions with said major dimensions being parallel to said generally horizontally disposed surface and said supporting surface;

said first and second pairs of slat elements lying directly adjacent the surface of the vehicle and adapted to have articles bear thereupon; and manually engageable means for adjustably and removably securing said second pair of slat elements to said first pair of slat elements wherein said second pair of slat elements is adjustably movable longitudinally along said first mentioned pair of slat elements and is completely removable from said first pair thereof.

2. The invention as set forth in claim 1 wherein said first pair of slat elements extend longitudinally of the vehicle and are arranged adjacent the laterally outer side edges of the roof portion thereof, and wherein said second pair of slat elements extend laterally of said first pair of elements and are secured at their laterally outer ends to said first pair of slat elements.

3. The invention as set forth in claim 1 which includes a pair of cross rails arranged generally parallel to said second pair of slat elements and spaced upwardly from the plane of said vehicle surface.

4. The invention as set forth in claim 3 wherein said second pair of slat elements and said cross rails are slidably connected to said first pair of slat elements.

5. The invention as set forth in claim 4 wherein each of said stanchion assemblies comprises an upwardly extending stanchion body having releasable means for detachably securing the associated end of said cross rail to one of said first mentioned pair of slat elements.

6. The invention as set forth in claim 5 wherein said releasable fastening means comprise tie down elements.

7. The invention as set forth in claim 6 wherein said tie down elements include clamping means for clampingly securing the opposite ends of said second pair of slat elements to said first pair of slat elements.

8. The invention as set forth in claim 6 which includes a pair of cross rails extending between said first mentioned pair of slat elements and arranged generally parallel to said second pair of slat elements, and wherein said cross rails include slide-way means for securing article constraining means thereto.

9. The invention as set forth in claim 8 wherein said second pair of slat elements is arranged directly adjacent the surface of the associated vehicle and are adapted to have loads supported thereon and are adjustably secured at their opposite ends to said first pair of slat elements.

10. The invention as set forth in claim 9 which includes a stanchion assembly located at each end of each of said cross rails for adjustably supporting said cross rails on said first pair of slat elements.

11. The invention as set forth in claim 9 wherein each of said cross rails comprises a coextensive channel portion for slidably supporting article restraining means thereon.

12. The invention as set forth in claim 3 which include the plurality of four stanchion assemblies located one at each end of each of said cross rails for adjustably and removably supporting said cross rails on said first pair of slat elements.

13. The invention as set forth in claim 1 which includes releasable fastening means for detachably securing the opposite ends of said second pair of slat elements to said first pair of slat elements.

14. The invention as set forth in claim 1 wherein said first pair of slat elements are generally flat and provide a low profile and have a substantially greater width than height relationship in transverse cross section.

15. The invention as set forth in claim 14 wherein said first pair of slat elements extend longitudinally of the vehicle, and which includes a pair of cross rails extending laterally between said first pair of slat elements and adjustably secured at their opposite ends to said first pair of slat elements.

16. The invention as set forth in claim 15 wherein each of said stanchion assemblies comprises a manual screw operated clamping means for clampingly securing the same to the associated of said first pair of slat elements.

17. The invention as set forth in claim 15 wherein said manual screw operated clamping means includes a manually engageable member disposed within a recessed area of each of the stanchion assemblies, a threaded stud member, and clamping means threadably engageable with said stud member for clampingly securing a portion of the associated of said first pair of slat members.

18. The invention as set forth in claim 14 wherein each of said second pair of slat elements is of a generally inverted U-shaped configuration and is fabricated of a sufficiently heavy gauge material to prevent deformation or deflection thereof when a load is placed on and is supported upon said roof portion by said second pair of slat elements.

* * * * *

UNITED STATES PATENT AND TRADEMARK OFFICE
CERTIFICATE OF CORRECTION

PATENT NO. : 4,364,500

DATED : December 21, 1982

INVENTOR(S) : John A. Bott

Page 1 of 2

It is certified that error appears in the above-identified patent and that said Letters Patent is hereby corrected as shown below:

| | |
|---|---|
| In the ABSTRACT | Insert --In one embodiment of the present invention, the slats secured to the exterior surface of the vehicle extend transversely, rather than longitudinally of the vehicle, and the article constraining bars or rails extend longitudinally of the vehicle. The cross-bars or rails may have attachment means thereon for securing ancillary article carrying equipment, such as ski racks, bike racks, and the like to the carrier system.-- CANNOT LOCATE REFERENCE TO DELETING THIS, SO APPEARS TO HAVE BEEN LEFT OUT. |
| Column 1, line 35 | "part" should be --past--. |
| Column 2, line 25 | After "the" insert --present--. |
| Column 4, line 26 | "60" should be --69--. |

UNITED STATES PATENT AND TRADEMARK OFFICE
CERTIFICATE OF CORRECTION

PATENT NO. : 4,364,500

DATED : December 21, 1982

INVENTOR(S) : John A. Bott

It is certified that error appears in the above-identified patent and that said Letters Patent is hereby corrected as shown below:

Column 5, line 40     "lenght" should be --length--.

Column 5, line 63     "slots" should be --slats--.

Column 10, line 40    "members" should be --elements--.

Signed and Sealed this

Twenty-third Day of August 1983

[SEAL]

Attest:

GERALD J. MOSSINGHOFF

Attesting Officer

Commissioner of Patents and Trademarks